United States Patent
Binkai et al.

(10) Patent No.: US 10,554,302 B2
(45) Date of Patent: Feb. 4, 2020

(54) OPTICAL COMMUNICATION APPARATUS AND FREQUENCY CONTROL METHOD

(71) Applicant: MITSUBISHI ELECTRIC CORPORATION, Tokyo (JP)

(72) Inventors: Masashi Binkai, Tokyo (JP); Keisuke Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/315,138

(22) PCT Filed: Jul. 21, 2016

(86) PCT No.: PCT/JP2016/071426
§ 371 (c)(1),
(2) Date: Jan. 3, 2019

(87) PCT Pub. No.: WO2018/016055
PCT Pub. Date: Jan. 25, 2018

(65) Prior Publication Data
US 2019/0312640 A1    Oct. 10, 2019

(51) Int. Cl.
*H04B 10/079* (2013.01)
*H04B 10/40* (2013.01)
(Continued)

(52) U.S. Cl.
CPC ... *H04B 10/07957* (2013.01); *H04B 10/0799* (2013.01); *H04B 10/2557* (2013.01);
(Continued)

(58) Field of Classification Search
None
See application file for complete search history.

(56) References Cited

U.S. PATENT DOCUMENTS 7,725,033 B2   5/2010   Nakamoto
9,698,905 B2   7/2017   Saito et al.
(Continued)

FOREIGN PATENT DOCUMENTS

JP   2007-104008 A   4/2007
JP   2016-10040 A   1/2016

OTHER PUBLICATIONS

Nakashima et al., "Experimental Investigation on Nonlinear Tolerance of Subcarrier Multiplexed Signals with Spectrum Optimization", ECOC 2015, Mo. 3. 6. 4., total of 5 pages.
(Continued)

*Primary Examiner* — David W Lambert
(74) *Attorney, Agent, or Firm* — Birch, Stewart, Kolasch & Birch, LLP (57) ABSTRACT

An optical communication apparatus receives a signal in which optical signals each including multiplexed subcarriers are frequency multiplexed, and includes: transceivers to perform reception process on a processing target band in which any one of the optical signals is included and to calculate a frequency offset amount between local light and a reception target optical signal that is included in the processing target band and calculate a carrier frequency interval between the local light and an optical signal adjacent to the reception target optical signal; and a frequency control unit to calculate an adjustment amount when an optical communication apparatus that is a source of the optical signals adjusts the frequencies of the optical signals based on the frequency offset amount and the carrier frequency interval calculated by the transceivers and to transmit the calculated adjustment amount to the optical communication apparatus that is a source of the optical signals.

7 Claims, 8 Drawing Sheets (51) Int. Cl.

| | |
|---|---|
| *H04B 10/572* | (2013.01) |
| *H04B 10/58* | (2013.01) |
| *H04B 10/61* | (2013.01) |
| *H04J 14/02* | (2006.01) |
| *H04B 10/2557* | (2013.01) |

(52) U.S. Cl.
CPC ........... *H04B 10/40* (2013.01); *H04B 10/572* (2013.01); *H04B 10/58* (2013.01); *H04B 10/61* (2013.01); *H04B 10/6164* (2013.01); *H04J 14/0224* (2013.01); *H04J 14/0227* (2013.01)

(56) References Cited

U.S. PATENT DOCUMENTS

| | | | |
|---|---|---|---|
| 2014/0286637 A1* | 9/2014 | Kikuchi | H04J 14/0212 398/48 |
| 2015/0381276 A1* | 12/2015 | Saito | H04B 10/07957 398/34 |
| 2016/0204875 A1* | 7/2016 | Araki | H04B 10/572 398/34 |
| 2016/0204876 A1* | 7/2016 | Kamura | H04J 14/0227 398/34 |
| 2016/0261362 A1* | 9/2016 | Ojima | H04B 10/572 |

OTHER PUBLICATIONS

Qiu et al., "Digital subcarrier multiplexing for fiber nonlinearity mitigation in coherent optical communication systems", Optics Express, vol. 22, No. 15, 2014 OSA, pp. 18770-18777.

* cited by examiner

OPTICAL COMMUNICATION APPARATUS AND FREQUENCY CONTROL METHOD

FIELD

The present invention relates to an optical communication apparatus included in an optical communication system and to a frequency control method.

BACKGROUND

In recent years, a great deal of research has gone into techniques for multiplexing optical signals at high density, with the aim of further expanding transmission capacity in optical communication systems. In optical transmission systems that multiplex a plurality of optical signals at high density, deterioration of transmission performance becomes conspicuous due to nonlinear optical effects during long distance transmission. Frequency shift in the order of GHz may occur in the wavelength-tunable light sources commonly used for optical transmission in digital coherent systems, and crosstalk between carriers is a cause of deterioration in transmission performance. In particular, in systems that multiplex subcarriers at high density such as superchannel technology, deterioration of transmission performance due to crosstalk becomes conspicuous.

A conventional invention for compensating for optical frequency shift is described in Patent Literature 1. In the invention described in Patent Literature 1, an optical transmission unit performs transmission after reducing the optical power of a specific wavelength from the wavelengths of a plurality of channels, and an optical reception unit evaluates the channel crosstalk amount from the bit error rate of a channel adjacent to the channel with reduced optical power in order to detect wavelength shift. Then, the optical transmission unit compensates for the detected wavelength shift to control wavelength intervals.

CITATION LIST

Patent Literature

Patent Literature 1: Japanese Patent Application Laid-open No. 2007-104008

SUMMARY

Technical Problem

In the technique described in Patent Literature 1, although the wavelength intervals are controlled by using the bit error rate, the bit error rate varies not only depending on the channel crosstalk amount but also due to the nonlinear optical effect of the transmission line and the like. Consequently, the channel crosstalk amount cannot be accurately evaluated by the bit error rate, and thus there is a problem in that the control of the wavelength intervals using the bit error rate lacks accuracy. In other words, there is a problem in that with the control based on the bit error rate described in Patent Literature 1, the wavelength of each channel may not be adjusted to a desired value.

The present invention has been made in view of the above, and an object thereof is to obtain an optical communication apparatus capable of realizing an optical communication system that controls wavelengths of optical signals that are multiplexed with high accuracy.

Solution to Problem

In order to solve the above-described problems and achieve the object, an optical communication apparatus according to an aspect of the present invention receives a signal in which a plurality of optical signals are frequency multiplexed and in which each of the optical signals includes a plurality of subcarriers that are multiplexed. The optical communication apparatus includes a plurality of transceivers to perform a reception process on a band which is a processing target and in which any one of the optical signals is included, and to calculate a frequency offset amount between local light and an optical signal to be received that is an optical signal included in the processing target band and calculate a carrier frequency interval that is a frequency interval between the local light and an optical signal adjacent to the optical signal to be received. The optical communication apparatus further includes a frequency control unit to calculate an adjustment amount when an optical communication apparatus that is a source of the optical signals adjusts the frequencies of the optical signals on a basis of the frequency offset amount and the carrier frequency interval calculated by the transceivers and to transmit the calculated adjustment amount to the optical communication apparatus that is a source of the optical signals.

Advantageous Effects of Invention

The optical communication apparatus according to the present invention has an effect of realizing an optical communication system that controls wavelengths of optical signals that are multiplexed with high accuracy.

DESCRIPTION OF EMBODIMENTS

Hereinafter, an optical communication apparatus and a frequency control method according to embodiments of the present invention will be described in detail with reference to the drawings. The invention is not limited to the embodiments.

Embodiment

Figure 1:
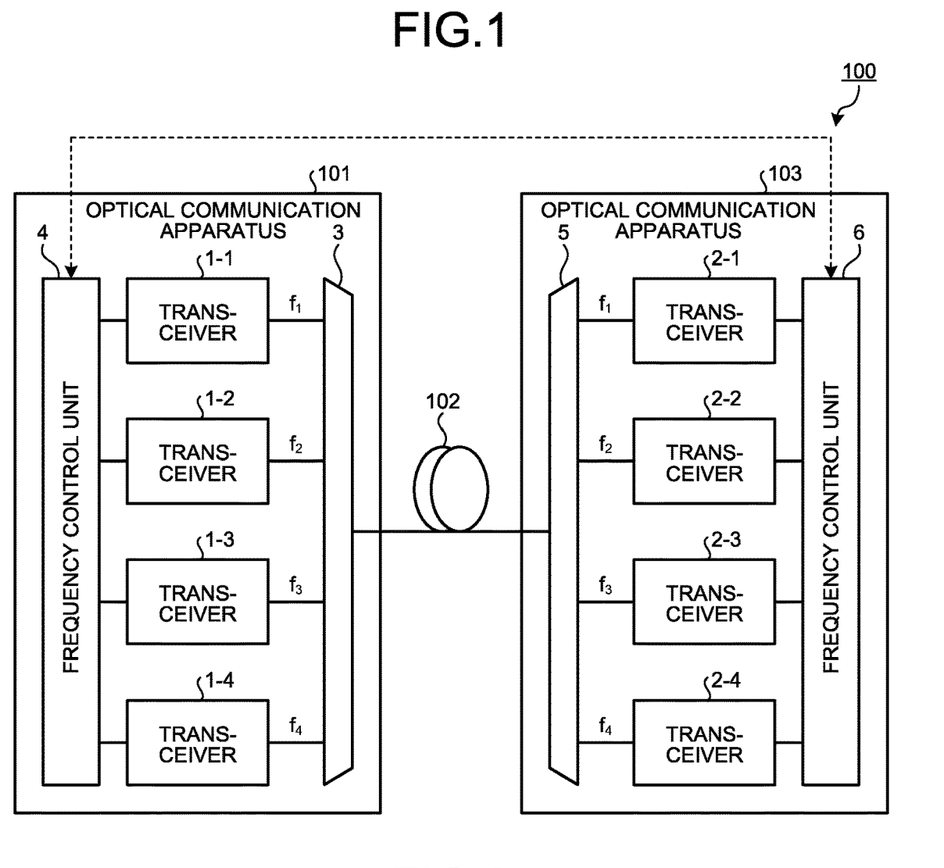
FIG. 1 is a diagram illustrating an example configuration of an optical communication system including optical communication apparatuses according to an embodiment.

FIG. 1 is a diagram illustrating an example configuration of an optical communication system including optical communication apparatuses according to an embodiment of the present invention. An optical communication system 100 illustrated in FIG. 1 is a subcarrier-multiplexed optical transmission system.

The optical communication system 100 includes optical communication apparatuses 101 and 103 that are optical communication apparatuses according to the present embodiment. These optical communication apparatuses 101 and 103 are connected by an optical fiber transmission line 102, which enables bidirectional communication therebetween. A communication operation from the optical communication apparatus 101 to the optical communication apparatus 103 and a communication operation from the optical communication apparatus 103 to the optical communication apparatus 101 are the same. In the present embodiment, as an example, a communication operation from the optical communication apparatus 101 to the optical communication apparatus 103 will be described. Thus, regarding the optical communication apparatus 101, a process necessary for transmitting signals will be described, and regarding the optical communication apparatus 103, a process necessary for receiving signals will be described. A communication operation from the optical communication apparatus 103 to the optical communication apparatus 101 is obtained by exchanging the process performed by the optical communication apparatus 101 for the process performed by the optical communication apparatus 103. The processes performed by the optical communication apparatus 101 and the optical communication apparatus 103 will be described below.

In the optical communication system 100 according to the present embodiment, the optical communication apparatuses 101 and 103 transmit/receive optical signals in which the number of multiplexed signals is four, i.e., optical signals in a state where four optical signals having different wavelengths are multiplexed.

The optical communication apparatus 101, which is a first optical communication apparatus, includes transceivers 1-1 to 1-4, which are first transceivers; a multiplexer/demultiplexer 3; and a frequency control unit 4.

The transceivers 1-1 to 1-4 each generate and transmit a subcarrier-multiplexed optical signal (hereinafter simply referred to as an "optical signal") that is an optical signal in which a plurality of subcarriers are multiplexed. Center frequencies (hereinafter simply referred to as frequencies) of the optical signals generated by the transceivers 1-1 to 1-4 are denoted by $f_1$ to $f_4$, respectively, and it is assumed that $f_1<f_2<f_3<f_4$ is satisfied. In the following description, the frequency of each optical signal may be referred to as a carrier frequency. The multiplexer/demultiplexer 3 multiplexes the optical signals output from the transceivers 1-1 to 1-4. The frequency control unit 4 controls the frequencies of the optical signals transmitted by the transceivers 1-1 to 1-4.

The optical communication apparatus 103, which is a second optical communication apparatus, includes transceivers 2-1 to 2-4, which are second transceivers; a multiplexer/demultiplexer 5; and a frequency control unit 6.

The multiplexer/demultiplexer 5 demultiplexes the optical signals transmitted from the transceivers 1-1 to 1-4 via the optical fiber transmission line 102, i.e., the frequency multiplexed optical signals, into optical signals before frequency multiplexing. The multiplexer/demultiplexer 5 inputs each of the demultiplexed optical signals to any one of the transceivers 2-1 to 2-4. In the present embodiment, the multiplexer/demultiplexer 5 inputs optical signals having the frequencies $f_1$, $f_2$, $f_3$, and $f_4$ to the transceivers 2-1, 2-2, 2-3, and 2-4, respectively. To each of the transceivers 2-1 to 2-4, light in a band wider than a band including a signal component to be received is input. For example, light in a band including an optical signal having the frequency $f_1$ is input to the transceiver 2-1.

The transceivers 2-1 to 2-4 receive optical signals input via the multiplexer/demultiplexer 5. In addition, the transceivers 2-1 to 2-4 each calculate the frequency offset amount indicating an error between the frequency of local light that is continuous wave light emitted by an internal wavelength-tunable light source and the frequency of a received optical signal, and they each calculate the carrier frequency interval that is the interval between the frequency of the local light and the frequency of an optical signal adjacent to the received optical signal.

On the basis of the frequency offset amount and the carrier frequency interval calculated by each of the transceivers 2-1 to 2-4, the frequency control unit 6 calculates a frequency compensation amount that is an adjustment amount of the frequency of each optical signal transmitted by the optical communication apparatus 101, and it transmits the result of the calculation to the optical communication apparatus 101.

Figure 2:
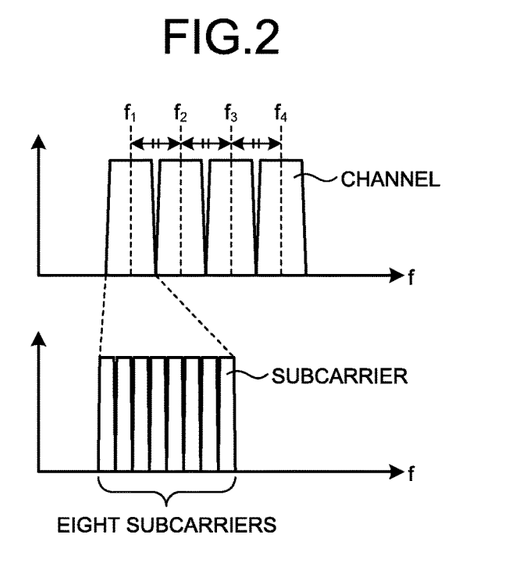
FIG. 2 is a diagram illustrating an example configuration of optical signals transmitted in a subcarrier-multiplexed optical transmission system.

Next, a subcarrier-multiplexed optical transmission system assumed to be used in the present embodiment will be described. FIG. 2 is a diagram illustrating an example configuration of optical signals transmitted in the subcarrier-multiplexed optical transmission system. The optical signals are transmitted from the transceivers 1-1 to 1-4 illustrated in FIG. 1 on a per channel basis as illustrated in FIG. 2. As illustrated in FIGS. 1 and 2, the configuration according to the present embodiment is a wavelength-multiplexed system that uses four waves.

FIG. 2 illustrates ideal frequency intervals of the optical signals transmitted in the wavelength-multiplexed system. That is, it is desirable that the intervals of the frequencies of the optical signals transmitted in the wavelength-multiplexed system be equally spaced as illustrated in the upper part of FIG. 2. Thus, in the optical communication system 100 of the present embodiment, the frequencies $f_1$ to $f_4$ of the optical signals are controlled such that the intervals of the frequencies of the optical signals to be subjected to the wavelength-multiplexing transmission are equally spaced. The lower part of FIG. 2 illustrates an example configuration of each channel. The channels have the same configuration, and FIG. 2 illustrates the configuration of an optical signal corresponding to the channel with the frequency $f_1$ as an example. As illustrated in the lower part of FIG. 2, one channel includes a plurality of subcarriers. The total transmission rate per channel is set to 100 Gbit/s (100 Gbps) or more. In FIG. 2, the system is configured to multiplex eight subcarriers per channel, but this is merely an example, and the number of multiplexed subcarriers is not limited to eight.

The number of multiplexed subcarriers allowable in the present embodiment is four or more. Regarding the modulation scheme, it is assumed to be a case where dual polarization-quadrature phase shift keying (DP-QPSK) is applied and the baud rate per subcarrier is 10 Gbaud or less. The characteristic of the subcarrier-multiplexed optical transmission resides in the fact that, because the baud rate per subcarrier can be reduced, transmission performance is superior when performing transmission of a signal with a transmission rate equivalent to 100 Gbps as compared to a system that performs transmission at 100 Gbps (32 Gbaud) with one wave.

Configurations of the transceivers 1-1 to 1-4 and 2-1 to 2-4 of the optical communication apparatuses 101 and 103 according to the present embodiment will be described here. Although frequencies of optical signals handled by these transceivers are different, the configurations of the transceivers are the same.

Figure 3:
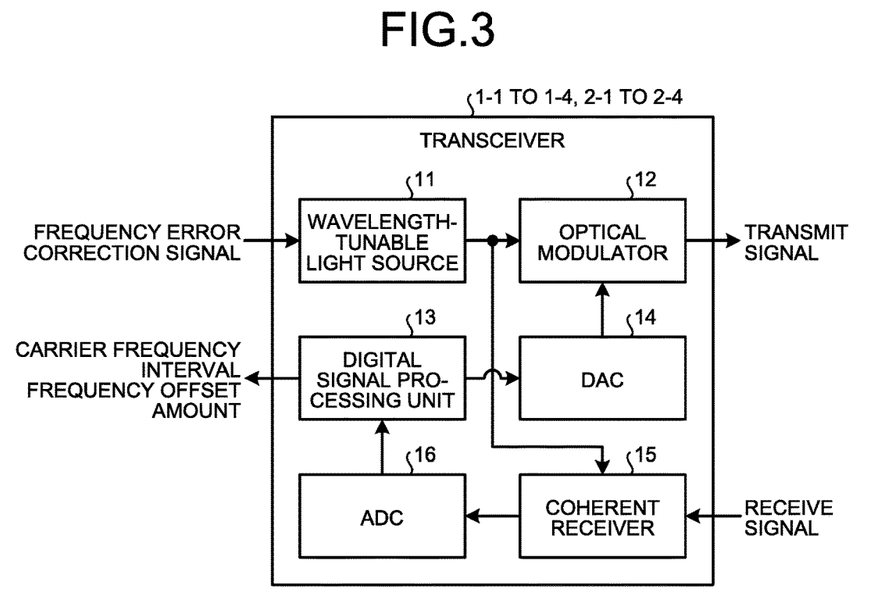
FIG. 3 is a diagram illustrating an example hardware configuration of transceivers according to the embodiment.

FIG. 3 is a diagram illustrating an example hardware configuration of the transceivers according to the present embodiment. As illustrated in FIG. 3, each of the transceivers 1-1 to 1-4 and 2-1 to 2-4 includes a wavelength-tunable light source 11; an optical modulator 12, a digital signal processing unit 13; a digital to analog converter (DAC) 14; a coherent receiver 15; and an analog to digital converter (ADC) 16.

The wavelength-tunable light source 11 emits continuous wave (CW) light of a preset wavelength, i.e., a preset frequency. For example, the wavelength-tunable light source 11 included in the transceiver 1-1 emits continuous wave light having the frequency $f_1$. When emitting the continuous wave light, the wavelength-tunable light source 11 adjusts the frequency of the continuous wave light to be emitted in real time in accordance with the control signal input from the frequency control unit 4 or 6. That is, the wavelength-tunable light source 11 adjusts the frequency of the continuous wave light to be emitted in accordance with the adjustment amount indicated by the input control signal. For example, the wavelength-tunable light source 11 included in the transceiver 1-1 adjusts the frequency of the continuous wave light to be emitted in accordance with the adjustment amount indicated by the control signal input from the frequency control unit 4. The continuous wave light emitted by the wavelength-tunable light source 11 is output to the optical modulator 12 and the coherent receiver 15.

The optical modulator 12 modulates the continuous wave light emitted from the wavelength-tunable light source 11 with a signal input from the DAC 14 to generate a transmit signal.

The digital signal processing unit 13 includes a digital signal processor (DSP) and the like. The digital signal processing unit 13 performs a process of generating transmission data and outputting the transmission data to the DAC 14 and also performs received digital signal processing. In the received digital signal processing, the digital signal processing unit 13 performs a demodulation process on a signal input from the ADC 16, a process of calculating the frequency offset amount between an optical signal received from a counterpart transceiver and the local light, and the like. The local light is continuous wave light input from the wavelength-tunable light source 11.

The DAC 14 converts the transmission data generated by the digital signal processing unit 13 from a digital signal into an analog signal, and it outputs the analog signal to the optical modulator 12.

The coherent receiver 15 performs coherent detection on a receive signal that is an optical signal transmitted from the counterpart optical communication apparatus and input via the multiplexer/demultiplexer 5. Specifically, the coherent receiver 15 causes mixed interference between the optical signal input via the multiplexer/demultiplexer 5 and the continuous wave light emitted by the wavelength-tunable light source 11, thereby converting the receive signal from the optical signal into an electric signal. The coherent receiver 15 outputs the electric signal obtained as a result of coherent detection to the ADC 16.

The ADC 16 converts the receive signal converted into the electric signal by the coherent receiver 15 from an analog signal to a digital signal, and it outputs the digital signal to the digital signal processing unit 13.

The configuration of the digital signal processing unit 13 will be described here with reference to the drawing. The characteristic of the digital signal processing unit 13 of the optical communication apparatus according to the present embodiment resides in the operation of processing a receive signal. Thus, in the present embodiment, the configuration relating to the processing of the receive signal will be described, and a description of the configuration relating to a transmission operation will be omitted. The configuration and the process relating to the transmission operation are similar to those of conventional coherent receivers.

Figure 4:
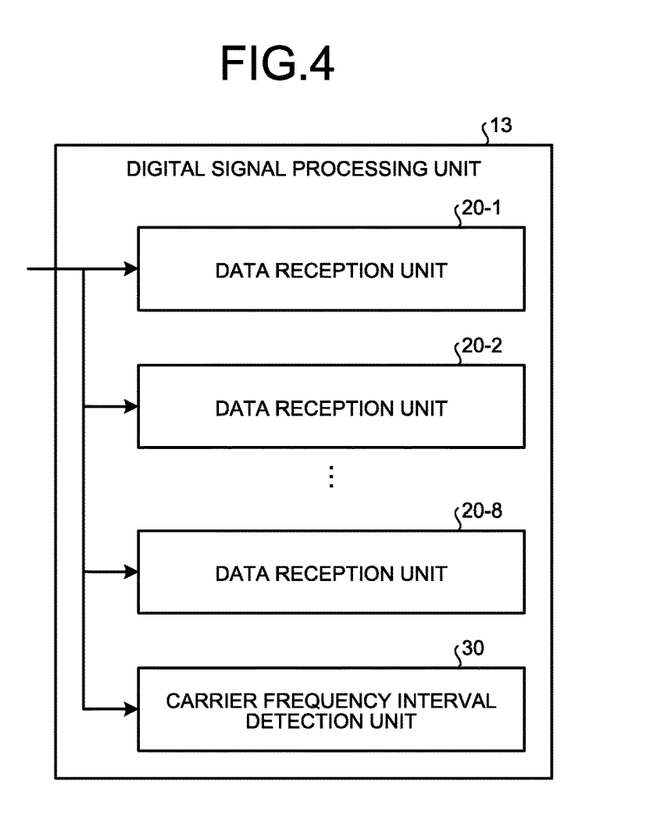
FIG. 4 is a diagram illustrating an example configuration of functional blocks that perform received digital signal processing in a digital signal processing unit according to the embodiment.

FIG. 4 is a diagram illustrating an example configuration of functional blocks that perform received digital signal processing in the digital signal processing unit 13 according to the embodiment. The digital signal processing unit 13 includes data reception units 20-1 to 20-8 and a carrier frequency interval detection unit 30 as functional blocks for performing received digital signal processing. A digital receive signal, which is a receive signal converted into a digital signal by the ADC 16, is input to the data reception units 20-1 to 20-8 and the carrier frequency interval detection unit 30.

The data reception units 20-1 to 20-8 demodulate received data of corresponding subcarriers. For example, the data reception unit 20-1 performs a demodulation process on a subcarrier with the lowest frequency, and the data reception unit 20-8 performs a demodulation process on a subcarrier with the highest frequency. The data reception units 20-1 to 20-8 have the same internal configuration but process different subcarriers.

The carrier frequency interval detection unit 30 calculates the carrier frequency interval between the local light and the optical signal of a channel adjacent to its own channel that is a channel used for reception by the transceiver in which the carrier frequency interval detection unit 30 is included. When calculating the carrier frequency interval, the carrier frequency interval detection unit 30 detects the frequency offset amount of the endmost subcarrier of the channel (hereinafter, adjacent channel) adjacent to its own channel. The endmost subcarrier of the adjacent channel is a subcarrier closest to the channel of the carrier frequency interval detection unit 30 among the subcarriers included in the adjacent channel. The frequency offset amount of the endmost subcarrier is the difference between the frequency of the local light and the frequency of the endmost subcarrier of the adjacent channel. In the present embodiment, the carrier frequency interval detection unit 30 detects the frequency offset of the endmost subcarrier of the adjacent channel having a higher frequency than its own channel, and it calculates the carrier frequency interval between the local light and the optical signal of the adjacent channel having a higher frequency than its own channel.

Figure 5:
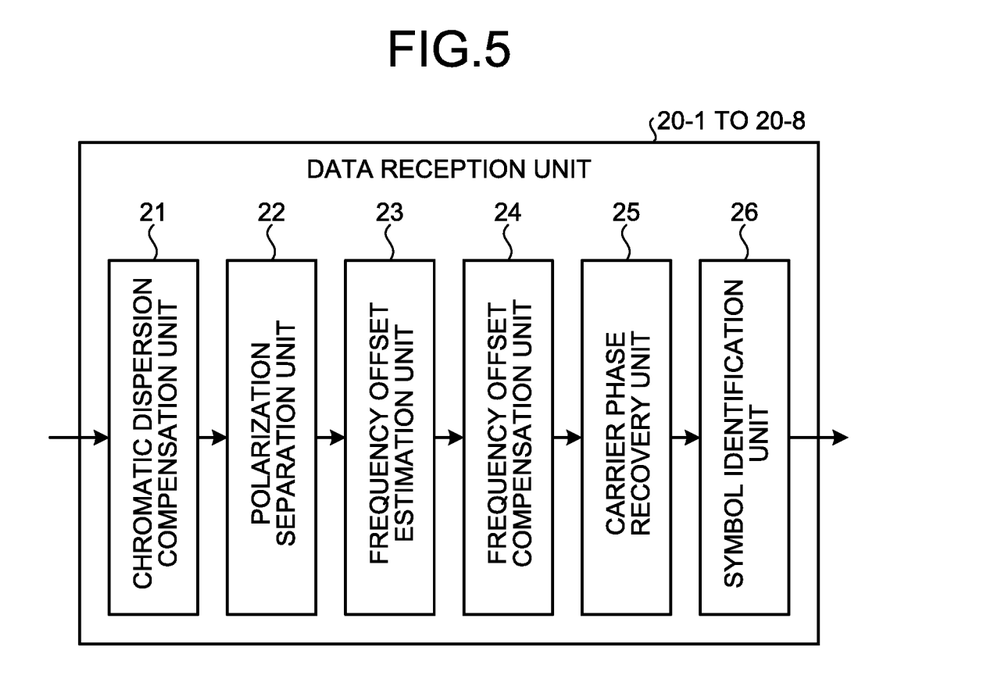
FIG. 5 is a diagram illustrating an example configuration of data reception units according to the embodiment.

FIG. 5 is a diagram illustrating an example configuration of the data reception units 20-1 to 20-8 according to the embodiment. The data reception units 20-1 to 20-8 each include a chromatic dispersion compensation unit 21, a polarization separation unit 22, a frequency offset estimation unit 23, a frequency offset compensation unit 24, a carrier phase recovery unit 25, and a symbol identification unit 26.

The chromatic dispersion compensation unit 21 compensates for chromatic dispersion of the digital receive signal, the chromatic dispersion being generated in the optical fiber transmission line 102. The polarization separation unit 22 separates the digital receive signal after the chromatic dispersion compensation into two signals in different polarization states. The frequency offset estimation unit 23 performs digital signal processing on the digital receive signal that has been polarized and separated by the polarization separation unit 22, and it estimates the frequency offset amount between the frequency of the optical signal received from the counterpart transceiver and the frequency of the continuous wave light emitted by the wavelength-tunable light source 11. The frequency offset compensation unit 24 compensates for the frequency offset of the digital receive signal on the basis of the result of the estimation performed by the frequency offset estimation unit 23. The carrier phase recovery unit 25 recovers the phase of the digital receive signal after the frequency offset compensation is performed by the frequency offset compensation unit 24. The symbol identification unit 26 determines the digital receive signal after the phase recovery is performed by the carrier phase recovery unit 25 to reproduce received data.

Figure 6:
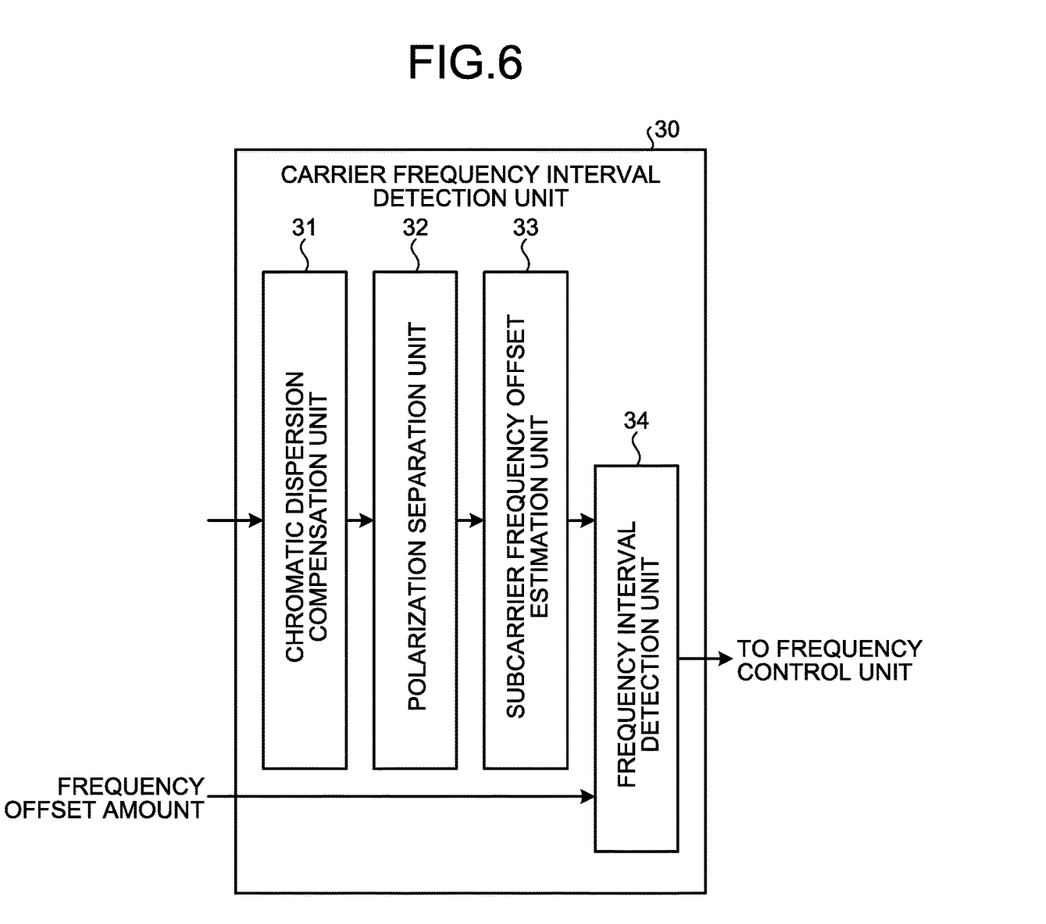
FIG. 6 is a diagram illustrating an example configuration of a carrier frequency interval detection unit according to the embodiment.

FIG. 6 is a diagram illustrating an example configuration of the carrier frequency interval detection unit 30. The carrier frequency interval detection unit 30 includes a chromatic dispersion compensation unit 31; a polarization separation unit 32; a subcarrier frequency offset estimation unit 33; and a frequency interval detection unit 34.

The chromatic dispersion compensation unit 31 is a processing unit similar to the chromatic dispersion compensation unit 21 of each of the data reception units 20-1 to 20-8, and it compensates for chromatic dispersion of the digital receive signal. The polarization separation unit 32 is a processing unit similar to the polarization separation unit 22 of each of the data reception units 20-1 to 20-8, and it separates the digital receive signal into two signals in different polarization states.

The subcarrier frequency offset estimation unit 33 performs digital signal processing on the receive signal that has been separated into two signals in different polarization states by the polarization separation unit 32, and it estimates the difference between the frequency of the endmost subcarrier of the adjacent channel and the frequency of the local light. For example, the subcarrier frequency offset estimation unit 33 performs arithmetic operations such as a discrete Fourier transformation or fast Fourier transformation on the receive signal to convert the receive signal into a frequency domain signal, and it analyzes the spectrum of the receive signal, thereby estimating the frequency offset amount of the endmost subcarrier, which is the difference between the carrier frequency of its own channel and the frequency of the endmost subcarrier of the adjacent channel.

The frequency interval detection unit 34 calculates the carrier frequency interval that is the interval between the frequency of the local light and the frequency of the adjacent channel on the basis of the result of the estimation performed by the subcarrier frequency offset estimation unit 33. The frequency interval detection unit 34 receives, from the frequency offset estimation unit 23 of each of the data reception units 20-1 to 20-8, the frequency offset amount between the frequency of the received optical signal and the frequency of the local light, and it outputs the received frequency offset amount and the calculated carrier frequency interval to the frequency control unit 6.

Here, the principle of calculation of the carrier frequency interval performed by the digital signal processing unit 13 in the received digital signal processing will be described.

In the conventional digital coherent optical transmission technologies, a frequency offset compensation circuit is used in order to correct a frequency offset that is a frequency error of light emitted from each light source and is caused by the difference between a light source used in a transmitter and a light source used in a receiver. In the optical communication apparatus according to the present embodiment, the frequency offset compensation circuit is used to adjust the frequency of each light source in the subcarrier-multiplexed optical transmission system to thereby control the frequency of each carrier of frequency-multiplexed signals with high accuracy.

Figure 7:
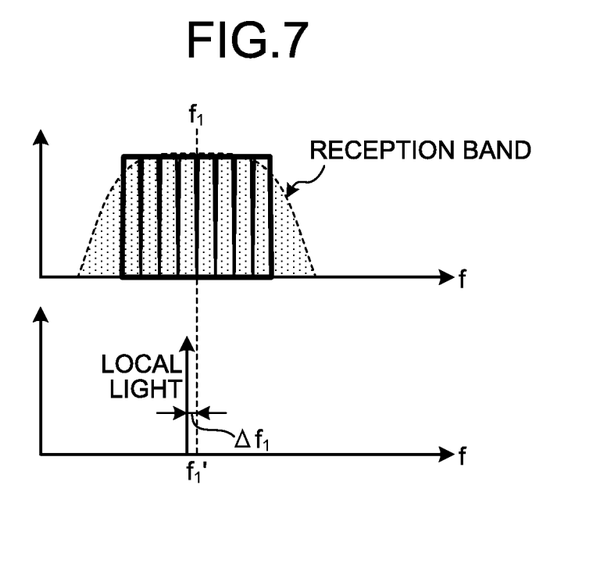
FIG. 7 is a diagram illustrating an example of frequency offset compensation using coherent detection.

FIG. 7 is a diagram illustrating an example of frequency offset compensation using coherent detection. FIG. 7 illustrates an example of a case where coherent detection is performed on an optical signal transmitted from the transceiver 1-1 illustrated in FIG. 1, i.e., an example of coherent detection performed by the transceiver 2-1. In the coherent detection, a signal component included in received light is detected by causing mixed interference between the local light and the received light. By performing digital signal processing on a signal after the coherent detection, it is possible to detect a frequency offset amount $\Delta f_1$ between the received light of the frequency $f_1$ and the local light of a frequency $f_1'$. As illustrated in the upper part of FIG. 7, the reception band of the coherent receiver that performs the coherent detection is wider than the signal band of the received light, and it is wider by about ±5 GHz for a signal of 32 Gbaud, for example. Thus, it is possible to detect the signal component of the endmost subcarrier of the adjacent channel.

Figure 8:
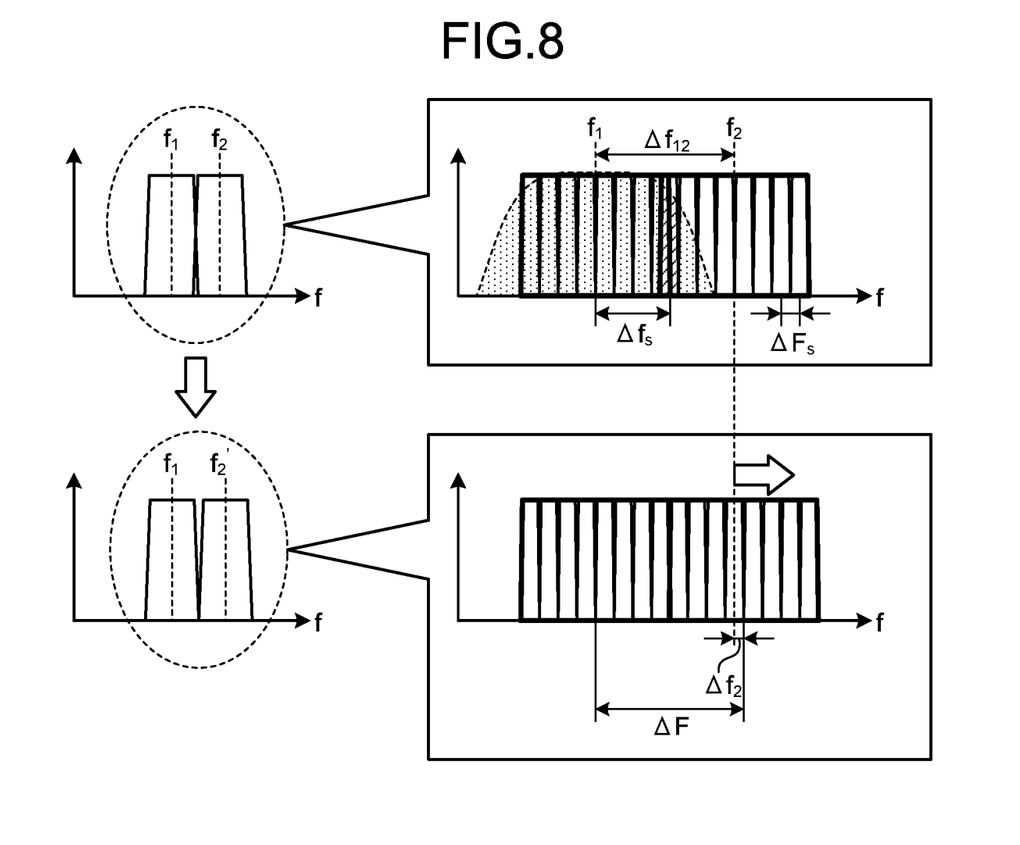
FIG. 8 is a diagram illustrating a concept of an operation of adjusting frequencies of optical signals in the optical communication system according to the embodiment.

FIG. 8 is a diagram illustrating a concept of an operation of adjusting frequencies of optical signals in the optical communication system according to the embodiment. FIG. 8 illustrates an operation example in a case of adjusting the frequency of an optical signal having the frequency $f_2$. In the example illustrated in FIG. 8, an ideal frequency interval between adjacent optical signals is denoted by $\Delta F$, and the interval between adjacent subcarriers in the same channel is denoted by $\Delta F_s$. $\Delta F$ and $\Delta F_s$ are predetermined fixed values.

As described above, the transceiver 2-1 that receives the optical signal having the frequency $f_1$ can detect the signal component of the endmost subcarrier of the adjacent channel by performing coherent detection, and it can estimate a frequency offset amount $\Delta f_s$ between the endmost subcarrier of the adjacent channel and the local light. The subcarrier frequency offset estimation unit 33 illustrated in FIG. 6 estimates $\Delta f_s$. Because the frequency offset amount $\Delta f_s$ can be estimated, the optical communication apparatus 103 can calculate a frequency compensation amount $\Delta f_2$, which is the frequency adjustment amount of the optical signal having the frequency $f_2$, by using the frequency offset amount $\Delta f_s$. That is, because the subcarrier interval $\Delta F_s$ is known and an interval $\Delta f_{12}$ between the frequency $f_1$ and the frequency $f_2$ is $\Delta f_s + 3.5 \Delta F_s$ as illustrated in the upper part of FIG. 8, it is possible to compare the frequency interval $\Delta f_{12}$ with the carrier frequency interval $\Delta F$ and to obtain the difference therebetween as the frequency compensation amount $\Delta f_2$ in the optical communication apparatus 103. Because the frequency compensation amount $\Delta f_2$ can be obtained, as illustrated in the lower part of FIG. 8, the transceiver 1-2 in the optical communication apparatus 101 can correct the frequency $f_2$ of the optical signal to be transmitted to a frequency $f_2'$. The frequency compensation amount $\Delta f_2$ is calculated by the frequency control unit 6 of the optical communication apparatus 103 and is indicated to the frequency control unit 4 of the optical communication apparatus 101.

Next, details of an operation of controlling the frequency of each optical signal transmitted in the optical communication system 100 according to the present embodiment will be described. Control of the frequency of each optical signal in the optical communication system 100 is roughly divided into two operations. In the first operation, a receiving optical communication apparatus calculates the frequency adjustment amount of a reference optical signal and the frequency adjustment amount of an optical signal adjacent to the reference optical signal on the basis of the reception result of the reference optical signal, and a transmitting optical communication apparatus adjusts the frequencies of the reference optical signal and the optical signal adjacent thereto on the basis of the calculated adjustment amounts. In the second operation, the receiving optical communication apparatus calculates the frequency adjustment amounts of the remaining optical signals using the frequencies of the optical signals adjusted during the first operation as reference, and the transmitting optical communication apparatus adjusts the frequencies of the remaining optical signals on the basis of the calculated adjustment amounts.

Here, a case where control is performed using an optical signal transmitted by the transceiver 1-1 illustrated in FIG. 1, i.e., an optical signal having the frequency $f_1$, as a reference optical signal will be described. The optical communication apparatuses 101 and 103 of the optical communication system 100 perform adjustment such that the frequency interval of optical signals transmitted by the transceivers 1-1 to 1-4 becomes $\Delta F$.

Figure 9:
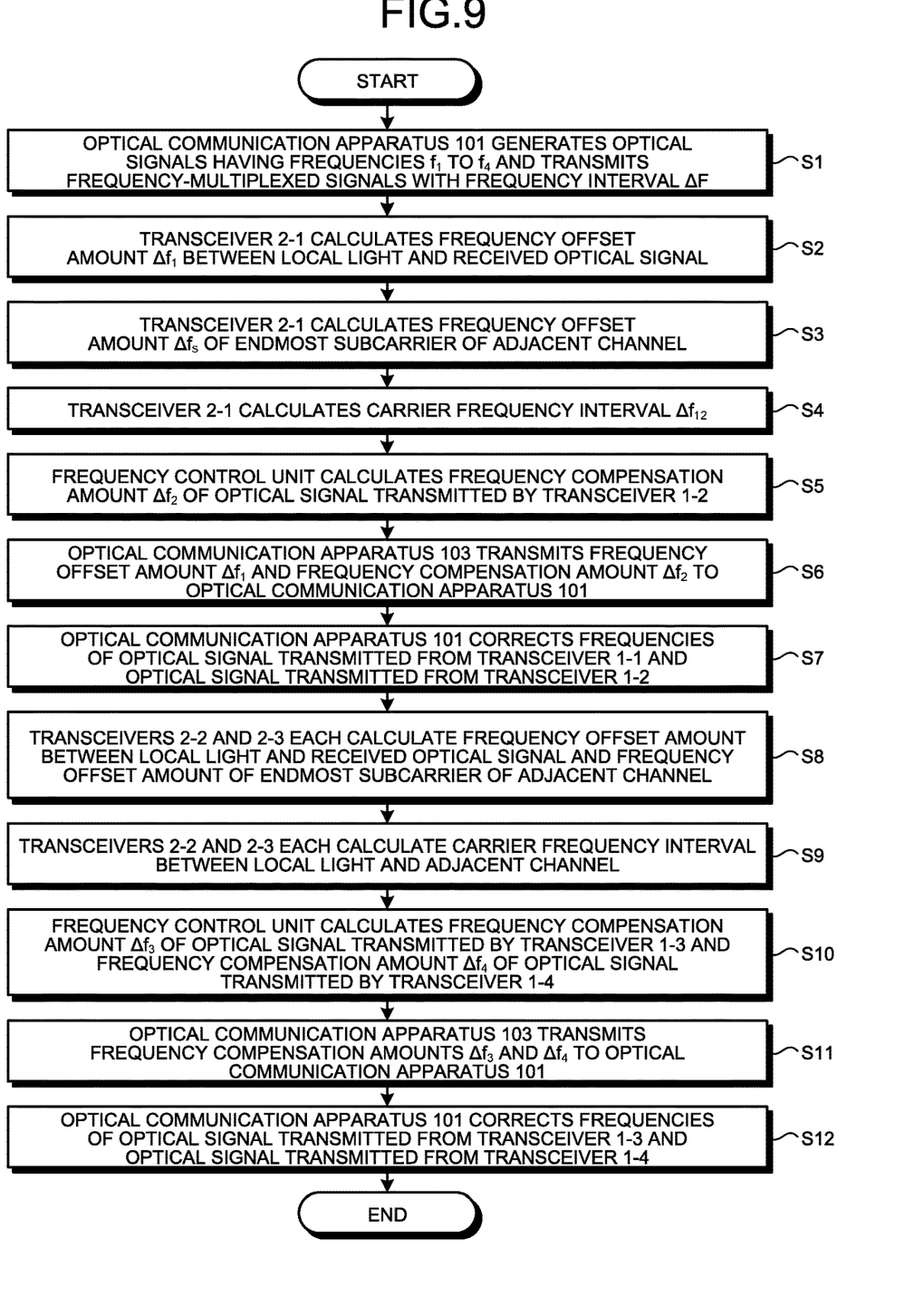
FIG. 9 is a flowchart illustrating an example of a frequency control operation of optical signals in the optical communication system according to the embodiment.

FIG. 9 is a flowchart illustrating an example of a frequency control operation of optical signals in the optical communication system according to the embodiment. The frequency control operation illustrated in FIG. 9 is performed at start-up of the optical communication system 100, i.e., at start-up of the optical communication apparatuses 101 and 103, and it is performed repeatedly thereafter at constant intervals. The frequency control operation is performed at intervals of, for example, one day, one week, or one month, as previously designated by the administrator of the system. The conditions for performing the frequency control operation are not limited thereto.

In the frequency control operation of optical signals in the optical communication system 100, first, the optical communication apparatus 101 generates optical signals having the frequencies $f_1$ to $f_4$ and it transmits frequency-multiplexed signals with the frequency interval $\Delta F$ (Step S1).

Figure 10:
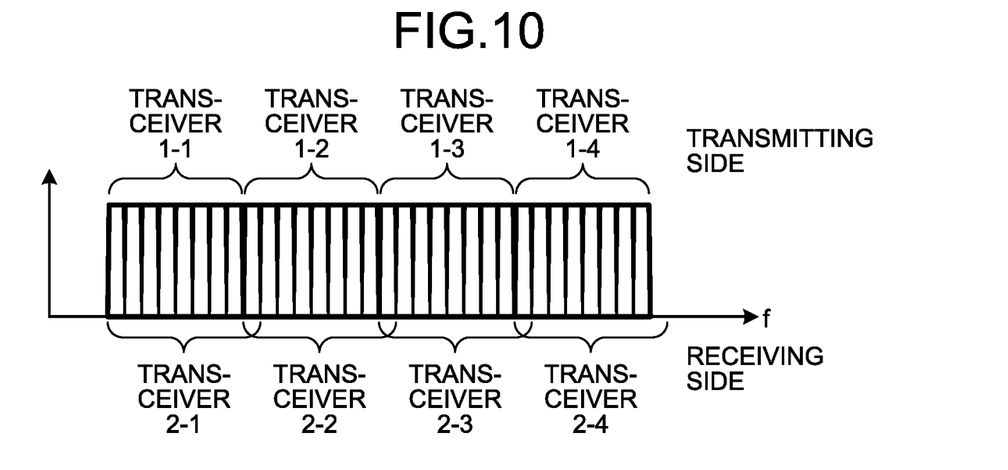
FIG. 10 is a diagram illustrating an example of the relationship among optical signals transmitted in the optical communication system.

Next, the transceiver 2-1 of the optical communication apparatus 103 receives the optical signal having the frequency $f_1$, which is the reference optical signal, and it calculates the frequency offset amount $\Delta f_1$ between the local light and the received optical signal (Step S2). FIG. 10 is a diagram illustrating an example of the relationship among optical signals transmitted in the optical communication system 100. FIG. 10 illustrates correspondence between the optical signals and the transmitting transceivers 1-1 to 1-4 and the receiving transceivers 2-1 to 2-4. As illustrated in FIG. 10, when the transceivers 2-1 to 2-4 receive the optical signals, they also receive the endmost subcarriers of the adjacent channels at the same time. For example, the transceiver 2-1 receives, in addition to each subcarrier of its own channel transmitted from the transceiver 1-1, the endmost subcarrier of the adjacent channel transmitted from the transceiver 1-2. The transceiver 2-2 receives, in addition to each subcarrier of its own channel transmitted from the transceiver 1-2, the endmost subcarrier of the adjacent channel transmitted from the transceiver 1-3.

Next, the transceiver 2-1 calculates the frequency offset amount $\Delta f_s$ of the endmost subcarrier of the adjacent channel having the carrier frequency $f_2$ transmitted from the transceiver 1-2 (Step S3). The process of Step S3, i.e., the process of calculating the frequency offset amount $\Delta f_s$, is performed by the subcarrier frequency offset estimation unit 33 included in the carrier frequency interval detection unit 30 of the digital signal processing unit 13.

Next, the transceiver 2-1 calculates the carrier frequency interval $\Delta f_{12}$ on the basis of the predetermined known subcarrier frequency interval $\Delta F_s$ and the frequency offset amount $\Delta f_s$ of the endmost subcarrier calculated in Step S3 (Step S4). The process of Step S4, i.e., the process of calculating the carrier frequency interval $\Delta f_{12}$, is performed by the frequency interval detection unit 34 included in the carrier frequency interval detection unit 30 of the digital signal processing unit 13. As already described, the following holds true: the carrier frequency interval $\Delta f_{12} = \Delta f_3 + 3.5 \Delta F_3$.

Next, the frequency control unit 6 of the optical communication apparatus 103 calculates the frequency compensation amount $\Delta f_2$ of the optical signal transmitted by the transceiver 1-2 on the basis of the carrier frequency interval $\Delta f_{12}$ calculated in Step S4 (Step S5). Specifically, when $\Delta F > \Delta f_{12}$ is satisfied, the frequency control unit 6 obtains $\Delta F - \Delta f_{12}$ as the frequency compensation amount $\Delta f_2$. When $\Delta F < \Delta f_{12}$ is satisfied, the frequency control unit 6 obtains $\Delta f_{12} - \Delta F$ as the frequency compensation amount $\Delta f_2$. When $\Delta F = \Delta f_{12}$ is satisfied, the frequency control unit 6 determines that the frequency compensation amount $\Delta f_2 = 0$.

After calculating the frequency compensation amount $\Delta f_2$, the frequency control unit 6 of the optical communication apparatus 103 transmits the frequency offset amount $\Delta f_1$ calculated in Step S2 described above and the frequency compensation amount $\Delta f_2$ to the optical communication apparatus 101 (Step S6). The frequency control unit 6 of the optical communication apparatus 103 may transmit the frequency offset amount $\Delta f_1$ and the frequency compensation amount $\Delta f_2$ to the optical communication apparatus 101 by using the optical fiber transmission line 102 or by using a control line (not illustrated).

Upon receiving the frequency offset amount $\Delta f_1$ and the frequency compensation amount $\Delta f_2$ from the optical communication apparatus 103, the optical communication apparatus 101 corrects the frequencies of the optical signal transmitted from the transceiver 1-1 and the optical signal transmitted from the transceiver 1-2 (Step S7). In Step S7, the frequency control unit 4 of the optical communication apparatus 101 outputs a control signal instructing the wavelength-tunable light source 11 of the transceiver 1-1 to change the frequency of the continuous wave light to be emitted by the frequency offset amount $\Delta f_1$, and it also outputs a control signal instructing the wavelength-tunable light source 11 of the transceiver 1-2 to adjust the frequency of the continuous wave light to be emitted by the frequency compensation amount $\Delta f_2$. The wavelength-tunable light source 11 of the transceiver 1-1 and the wavelength-tunable light source 11 of the transceiver 1-2 each adjust the frequency of the continuous wave light to be emitted in accordance with the instruction from the frequency control unit 4. As a result, the adjustment of the frequencies of the optical signals transmitted by the transceivers 1-1 and 1-2 is completed, and the carrier frequency interval of these optical signals becomes ΔF.

Next, the transceivers 2-2 and 2-3 of the optical communication apparatus 103 each calculate the frequency offset amount between the local light and the received optical signal and the frequency offset amount of the endmost subcarrier of the adjacent channel (Step S8). The optical signal received by the transceiver 2-2 is the optical signal after the frequency is corrected in Step S7 described above. The transceiver 2-4 does not need to calculate the frequency offset amount between the received optical signal and the local light and the frequency offset amount of the endmost subcarrier of the adjacent channel. In Step S8, the transceivers 2-2 and 2-3 perform processes similar to the processes performed by the transceiver 2-1 in Steps S2 and S3 described above to calculate the frequency offset amount between the received optical signal and the local light and the frequency offset amount of the endmost subcarrier of the adjacent channel.

Next, the transceivers 2-2 and 2-3 each calculate the carrier frequency interval between the local light and the adjacent channel on the basis of the frequency offset amount of the endmost subcarrier of the adjacent channel calculated in Step S8 (Step S9). In Step S9, the transceiver 2-2 calculates a carrier frequency interval $\Delta f_{23}$ between the local light and the adjacent channel having a frequency $f_3$. The transceiver 2-3 calculates a carrier frequency interval $\Delta f_{34}$ between the local light and the adjacent channel having a frequency $f_4$. The transceivers 2-2 and 2-3 perform a process similar to the process performed by the transceiver 2-1 in the Step S4 described above to calculate the carrier frequency interval.

Next, the frequency control unit 6 of the optical communication apparatus 103 calculates the frequency compensation amount $\Delta f_3$ of the optical signal transmitted by the transceiver 1-3 of the optical communication apparatus 101 and the frequency compensation amount $\Delta f_4$ of the optical signal transmitted by the transceiver 1-4 of the optical communication apparatus 101 on the basis of the frequency offset amount calculated in Step S8 and the carrier frequency interval calculated in Step S9 (Step S10). Details of the method for calculating the frequency compensation amounts $\Delta f_3$ and $\Delta f_4$ will be described later.

After calculating the frequency compensation amounts $\Delta f_3$ and $\Delta f_4$, the optical communication apparatus 103 transmits the frequency compensation amounts $\Delta f_3$ and $\Delta f_4$ to the optical communication apparatus 101 (Step S11). The frequency control unit 6 of the optical communication apparatus 103 may transmit the frequency compensation amounts $\Delta f_3$ and $\Delta f_4$ to the optical communication apparatus 101 by using the optical fiber transmission line 102 or by using a control line (not illustrated).

Upon receiving the frequency compensation amounts $\Delta f_3$ and $\Delta f_4$ from the optical communication apparatus 103, the optical communication apparatus 101 corrects the frequencies of the optical signal transmitted from the transceiver 1-3 and the optical signal transmitted from the transceiver 1-4 (Step S12). In Step S12, the frequency control unit 4 of the optical communication apparatus 101 outputs a control signal instructing the wavelength-tunable light source 11 of the transceiver 1-3 to change the frequency of the continuous wave light to be emitted by the frequency compensation amount $\Delta f_3$, and it also outputs a control signal instructing the wavelength-tunable light source 11 of the transceiver 1-4 to adjust the frequency of the continuous wave light to be emitted by the frequency compensation amount $\Delta f_4$. The wavelength-tunable light source 11 of the transceiver 1-3 and the wavelength-tunable light source 11 of the transceiver 1-4 each adjust the frequency of the continuous wave light to be emitted in accordance with the instruction from the frequency control unit 4. As a result, the adjustment of the frequencies of the optical signals transmitted by the transceivers 1-3 and 1-4 is completed, and the carrier frequency interval between the optical signals transmitted by the optical communication apparatus 103 becomes ΔF.

As described above, in the optical communication system 100, first, the channel having the lowest frequency $f_1$ among the four channels is set as the reference channel, and the wavelength-tunable light source 11 of the transceiver 1-1 that transmits the optical signal of the reference channel and the wavelength-tunable light source 11 of the transceiver 1-2 that transmits the optical signal of the channel adjacent to the reference channel are adjusted. Next, with the use of the frequencies $f_1'$ and $f_2'$ of the optical signals after completion of the adjustment as references, the adjustment amounts of the frequencies $f_3$ and $f_4$ of the optical signals transmitted by the remaining transceivers 1-3 and 1-4 are determined, and the wavelength-tunable light sources 11 of the transceivers 1-3 and 1-4 are adjusted. That is, in the optical communication system 100, when the adjustment amount of the frequency $f_1$ of the reference channel is determined, the adjustment amount of the frequency $f_2$ of the channel adjacent to the reference channel is also determined. In the optical communication system 100, after the adjustment amounts of the frequencies of these two channels are determined, the frequencies of these two channels are adjusted, and the frequencies of the other channels are adjusted using the frequencies of the two channels after the adjustment as references. Although the example that has been described is one in which the optical signal having the frequency $f_1$, which is the lowest frequency, is used as the reference channel, the frequency of each channel may be adjusted using the optical signal having the frequency $f_4$, which is the highest frequency, as the reference channel. In such a case as well, it is possible to adjust the frequency of each channel by a procedure similar to the above-described procedure. In the present embodiment, the number of carriers, i.e., the number of optical signals that are multiplexed, is set to four, but similar control is possible even when the number of carriers is n (an integer of 5 or more). Some current optical communication systems use about 100 carriers. Also for such systems, it is possible to apply the above-described frequency control to adjust the frequency of each carrier and to adjust the frequency interval between carriers to an ideal interval.

Figure 11:
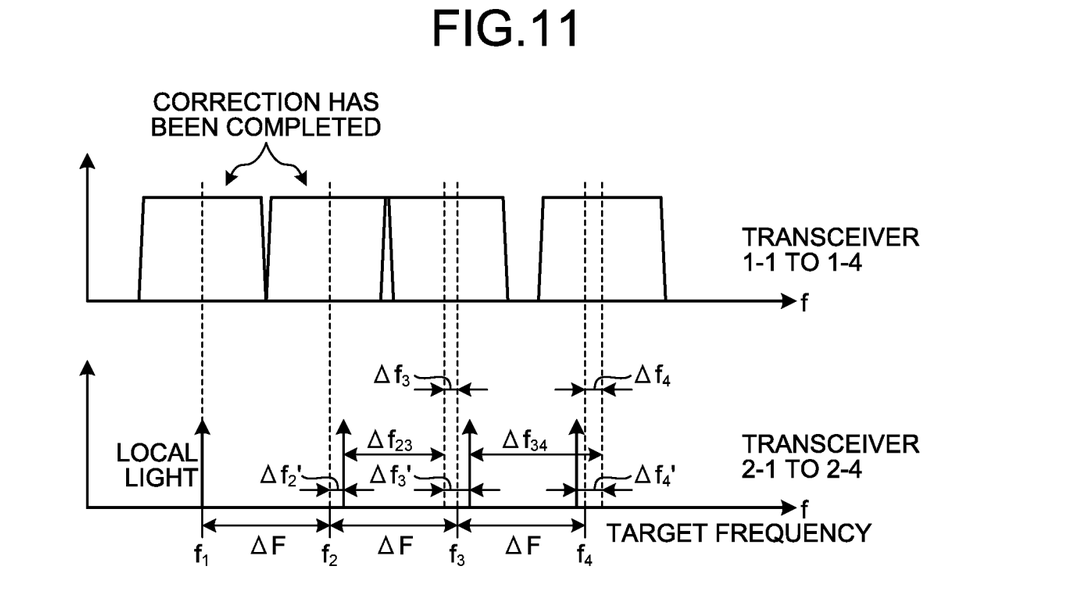
FIG. 11 is a diagram explaining the frequency control operation in the optical communication system.

Next, a description will be given of a method for calculating the frequency offset compensation amounts $\Delta f_3$ and $\Delta f_4$ performed by the frequency control unit 6 of the optical communication apparatus 103 in Step S10 described above. FIG. 11 is a diagram explaining the frequency control operation in the optical communication system 100. The upper part of FIG. 11 illustrates the relationship among the optical signals transmitted by the transceivers 1-1 to 1-4 after the adjustment of the carrier frequencies $f_1$ and $f_2$ is completed. The lower part of FIG. 11 illustrates, with the up arrows, the frequencies of the local light emitted by the wavelength-tunable light sources 11 of the transceivers 2-1 to 2-4. In the frequency control operation in the optical communication system 100, adjustment is performed such that the frequencies of the optical signals transmitted by the transceivers 1-1 to 1-4 become the target frequencies $f_1$ to $f_4$.

Because the transceivers 1-1 to 1-4 of the optical communication apparatus 101 and the transceivers 2-1 to 2-4 of the optical communication apparatus 103 individually have wavelength-tunable light sources, there is a unique frequency error in each optical signal transmitted and received between the optical communication apparatus 101 and the optical communication apparatus 103. In the state illustrated in FIG. 11, the correction of the carrier frequencies of the optical signals transmitted by the transceivers 1-1 and 1-2 has been completed and the carrier frequency interval is $\Delta F$. However, the carrier frequency interval between the optical signal transmitted by the transceiver 1-2 and the optical signal transmitted by the transceiver 1-3 is not $\Delta F$, and the carrier frequency interval between the optical signal transmitted by the transceiver 1-3 and the optical signal transmitted by the transceiver 1-4 is also not $\Delta F$. In the example illustrated in FIG. 11, in order to adjust the carrier frequency interval between the optical signal transmitted by the transceiver 1-2 and the optical signal transmitted by the transceiver 1-3 to $\Delta F$, it is necessary to adjust the frequency of the optical signal transmitted by the transceiver 1-3 by the frequency compensation amount $\Delta f_3$. In order to adjust the carrier frequency interval between the optical signal transmitted by the transceiver 1-3 and the optical signal transmitted by the transceiver 1-4 to $\Delta F$, it is necessary to adjust the frequency of the optical signal transmitted by the transceiver 1-4 by the frequency compensation amount $\Delta f_4$.

In FIG. 11, $\Delta f_2'$ represents the frequency offset amount between the optical signal transmitted by the transceiver 1-2 and the local light emitted by the wavelength-tunable light source 11 of the transceiver 2-2. $\Delta f_3'$ represents the frequency offset amount between the optical signal transmitted by the transceiver 1-3 and the local light emitted by the wavelength-tunable light source 11 of the transceiver 2-3. $\Delta f_4'$ represents the frequency offset amount between the optical signal transmitted by the transceiver 1-4 and the local light emitted by the wavelength-tunable light source 11 of the transceiver 2-4. The optical signal transmitted by the transceiver 1-2 is an optical signal whose frequency has been adjusted. $\Delta f_{23}$ represents the carrier frequency interval between the local light of the transceiver 2-2 and the optical signal transmitted by the transceiver 1-3, and $\Delta f_{34}$ represents the carrier frequency interval between the local light of the transceiver 2-3 and the optical signal transmitted by the transceiver 1-4. As already described, $\Delta f_2'$ and $\Delta f_{23}$ are calculated by the transceiver 2-2. $\Delta f_3'$ and $\Delta f_{34}$ are calculated by the transceiver 2-3, and $\Delta f_4'$ is calculated by the transceiver 2-4.

In the case of the example illustrated in FIG. 11, the frequency control unit 6 calculates $\Delta f_3$ and $\Delta f_4$ according to the following formulas (1) and (2).

$$\Delta f_3 = \Delta F - (\Delta f_{23} + \Delta f_2') \qquad (1)$$

$$\Delta f_4 = (\Delta f_2' + \Delta f_{23} + \Delta f_3' + \Delta f_{34}) - 2\Delta F \qquad (2)$$

In the example illustrated in FIG. 11, because $\Delta F$ is larger than $(\Delta f_{23} + \Delta f_2')$, the formula (1) is used for the calculation of $\Delta f_3$, but when $\Delta F$ is smaller than $(\Delta f_{23} + \Delta f_2')$, it is satisfactory if the following formula (3) is used for the calculation of $\gamma f_3$.

$$\Delta f_3 = (\Delta f_{23} + \Delta f_2') - \Delta f \qquad (3)$$

Similarly, in the example illustrated in FIG. 11, because $(\Delta f_2' + \Delta f_{23} + \Delta f_3' + \Delta f_{34})$ is larger than $2\Delta F$, the formula (2) is used for the calculation of $\Delta f_4$, but when $(\Delta f_2' + \Delta f_{23} + \Delta f_3' + \Delta f_{34})$ is smaller than $2\Delta F$, it is satisfactory if the following formula (4) is used for the calculation of $\Delta f_4$.

$$\Delta f_4 = 2\Delta F - (\Delta f_2' + \Delta f_{23} + \Delta f_3' + \Delta f_{34}) \qquad (4)$$

In each of the transceivers 2-1 to 2-4 on the side on which the optical signals are received, it is necessary to adjust the frequency of the local light such that the frequency offset between the local light and the received optical signal becomes zero, and this adjustment is performed by using a method similar to the conventional methods.

The case where the number of transceivers included in each of the optical communication apparatuses 101 and 103 is four has been described. However, even if the number of transceivers is five or more, it is still possible to calculate the frequency offset compensation amounts by a similar method. That is, when n is an integer of 5 or more, after the adjustment of the frequencies of the reference channel and the channel adjacent to the reference channel is completed in the transmitting optical communication apparatus 101, the carrier frequency interval detection unit in each transceiver in the receiving optical communication apparatus 103 detects the frequency offset amount between the local light and the received light and the carrier frequency interval between the local light and the adjacent channel. Then, in the optical communication apparatus 103, the frequency control unit can calculate the frequency compensation amounts $\Delta f_3$, $\Delta f_4$, . . . , and $\Delta f_n$ of the remaining channels using the frequency offset amounts $\Delta f_2'$, $f_3'$, . . . , and $f_{(n-1)}'$ and the carrier frequency intervals $\Delta f_{12}$, $\Delta f_{23}$, . . . , and $\Delta f_{(n-1)n}$ detected in the transceivers.

As described above, in the receiving optical communication apparatus of the optical communication system according to the present embodiment, each of the multiple transceivers calculates the frequency offset amount between the local light and an optical signal of its own channel that is to be received and also calculates the carrier frequency interval between the local light and an optical signal of a channel adjacent to its own channel, and the frequency control unit calculates the frequency compensation amount for each optical signal transmitted by the transmitting optical communication apparatus on the basis of the frequency offset amount and the carrier frequency interval calculated in each of the transceivers. This makes it possible to control the frequency interval of optical signals transmitted between the transmitting optical communication apparatus and the receiving optical communication apparatus with high accuracy, and to realize an optical communication system capable of reducing the transmission penalty in long distance transmission. In addition, because it is possible to monitor the carrier frequency interval in real time to adjust the frequency of each optical signal, an optical communication system capable of correcting a frequency shift of a light source due to aged deterioration can be realized.

Figure 12:
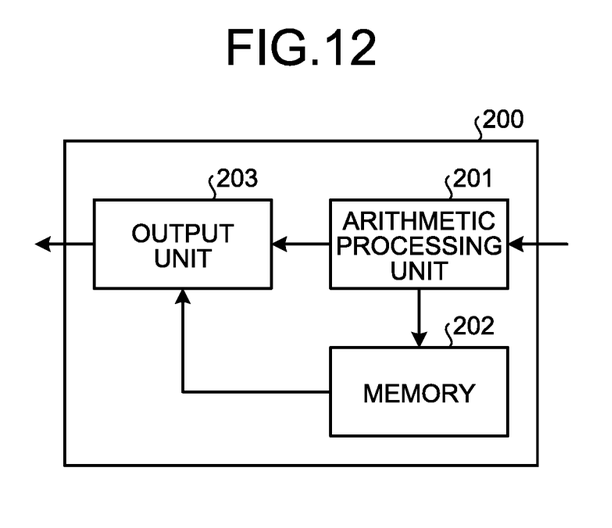
FIG. 12 is a diagram illustrating an example hardware configuration of a frequency control unit.

Next, a hardware configuration that realizes the frequency control unit 4 of the optical communication apparatus 101 and the frequency control unit 6 of the optical communication apparatus 103 will be described. FIG. 12 is a diagram illustrating an example hardware configuration of the frequency control units 4 and 6. The frequency control units 4 and 6 are each realized by a processing circuit 200 configured to include an arithmetic processing unit 201, a memory 202, and an output unit 203. The arithmetic processing unit 201 is a central processing unit (CPU, also referred to as central processing device, processing device, arithmetic device, microprocessor, microcomputer, processor, and DSP), system large scale integration (LSI), or the like. As the memory 202, a nonvolatile or volatile semiconductor memory such as a random access memory (RAM), a read only memory (ROM), a flash memory, an erasable programmable read only memory (EPROM), or an electrically erasable programmable read only memory (EEPROM) is commonly used. The output unit 203 is an electronic circuit that outputs information output from the arithmetic processing unit 201 or the memory 202 to external devices.

When included in the frequency control unit 6 on the side on which the optical signals are received, the arithmetic processing unit 201 calculates the frequency compensation amount for an optical signal transmitted by each transceiver on the side on which the optical signals are transmitted on the basis of the frequency offset amount and the carrier frequency interval calculated by each transceiver on the side on which the optical signals are received. When included in the frequency control unit 4 on the side on which the optical signals are transmitted, the arithmetic processing unit 201 generates a control signal instructing each transceiver on the transmitting side to adjust the frequency of the optical signal on the basis of the frequency compensation amount calculated by the frequency control unit 6 on the receiving side. The memory 202 temporarily stores various types of information such as the frequency compensation amount calculated by the arithmetic processing unit 201. When included in the frequency control unit 6 on the side on which the optical signals are received, the output unit 203 receives the frequency compensation amount calculated by the arithmetic processing unit 201 and it outputs the frequency compensation amount to the counterpart frequency control unit 4. When included in the frequency control unit 4 on the side on which the optical signals are transmitted, the output unit 203 outputs the control signal generated by the arithmetic processing unit 201 to its counterpart transceiver.

In the optical communication system according to the present embodiment, the receiving optical communication apparatus calculates the frequency compensation amount, which is an adjustment amount for the frequency of each optical signal, and it feeds the frequency compensation amount back to the transmitting optical communication apparatus, and the transmitting optical communication apparatus adjusts the frequency of each optical signal on the basis of the frequency compensation amount thus fed back. However, this configuration is merely an example, and the frequency compensation amount for each optical signal may be calculated by the transmitting optical communication apparatus. In such a case, the receiving optical communication apparatus feeds the frequency offset amount between the received optical signal and the local light and the frequency offset amount between the local light and the endmost subcarrier of the adjacent channel back to the transmitting optical communication apparatus. The method by which the transmitting optical communication apparatus calculates the frequency compensation amount for each optical signal is similar to the method by which the receiving optical communication apparatus calculates the frequency compensation amount for each optical signal.

The frequency control units included in the transmitting and receiving optical communication apparatuses may be an independent separate device. Specifically, an optical communication system may be employed that has a configuration in which the frequency control units 4 and 6 are removed from the optical communication apparatuses 101 and 103, respectively, and a control device having a function as the frequency control units 4 and 6 calculates the frequency compensation amount for each of the optical signals transmitted from the transceivers 1-1 to 1-4 of the optical communication apparatus 101. In such a case, in the optical communication apparatus 103, the transceivers 2-1 to 2-4 each calculate the frequency offset amount between the received optical signal and the local light and also the frequency offset amount between the local light and the endmost subcarrier of the adjacent channel, and they transmit the results of the calculation to the control device. Upon receiving the results of the calculation performed by the transceivers 2-1 to 2-4, the control device calculates the frequency compensation amount for each of the optical signals transmitted from the transceivers 1-1 to 1-4 of the optical communication apparatus 101 on the basis of the received calculation results. In addition, the control device notifies the optical communication apparatus 101 of the calculated compensation amounts, and it instructs the optical communication apparatus 101 to adjust the frequencies of the optical signals transmitted by the transceivers 1-1 to 1-4. The method by which the control device calculates the frequency compensation amount for each of the optical signals transmitted from the transceivers 1-1 to 1-4 of the optical communication apparatus 101 is similar to the method by which the frequency control unit 6 of the optical communication apparatus 103 described above calculates the frequency compensation amount for each of the optical signals transmitted from the transceivers 1-1 to 1-4 of the optical communication apparatus 101.

The configurations described in the embodiment above are merely examples of the content of the present invention and can be combined with other known technology and part thereof can be omitted or modified without departing from the gist of the present invention.

REFERENCE SIGNS LIST 1-1 to 1-4, 2-1 to 2-4 transceiver; 3, 5 multiplexer/demultiplexer; 4, 6 frequency control unit; 11 wavelength-tunable light source; 12 optical modulator; 13 digital signal processing unit; 14 digital to analog converter (DAC); 15 coherent receiver; 16 analog to digital converter (ADC); 20-1 to 20-8 data reception unit; 21, 31 chromatic dispersion compensation unit; 22, 32 polarization separation unit; 23 frequency offset estimation unit; 24 frequency offset compensation unit; 25 carrier phase recovery unit; 26 symbol identification unit; 30 carrier frequency interval detection unit; 33 subcarrier frequency offset estimation unit; 34 frequency interval detection unit; 100 optical communication system; 101, 103 optical communication apparatus.

The invention claimed is:

1. An optical communication apparatus that receives a frequency multiplexed signal in which a plurality of optical signals are frequency multiplexed and in which each of the optical signals includes a plurality of multiplexed subcarriers, the optical communication apparatus comprising:

a plurality of transceivers, each of the transceivers corresponding to a respective one of the plurality of optical signals and configured to perform a reception process on a band which is a processing target and in which a corresponding one of the optical signals is included, and to calculate a frequency offset amount between a frequency of local light and a carrier frequency of the corresponding one of the optical signals and calculate a carrier frequency interval that is a frequency interval between the frequency of the local light and a carrier frequency of an optical signal adjacent to the corresponding one of the optical signals; and a frequency controller configured to calculate an adjustment amount on a basis of the calculated frequency offset amount and the calculated carrier frequency interval and to transmit the calculated adjustment amount to an optical communication apparatus that is a source of the optical signals, the transmitted adjustment amount being used by the source optical communication apparatus to adjust the carrier frequencies of the optical signals.

2. The optical communication apparatus according to claim 1, wherein each of the transceivers comprises:
   a coherent receiver to perform coherent detection on the processing target band to convert the corresponding one of the optical signals into an electric signal; and
   a digital signal processor to perform digital signal processing on the electric signal to calculate the frequency offset amount and the carrier frequency interval.

3. The optical communication apparatus according to claim 2, wherein the digital signal processor calculates the carrier frequency interval on a basis of a signal component of a part of the optical signal adjacent to the corresponding one of the optical signals, the signal component of the part of the optical signal being included in the electric signal.

4. The optical communication apparatus according to claim 3, wherein the digital signal processor calculates, on a basis of the signal component of the optical signal adjacent to the corresponding one of the optical signals, a frequency interval between the frequency of the local light and a subcarrier located at an end portion of the optical signal adjacent to the corresponding one of the optical signals, the end portion being on a side closer to the corresponding one of the optical signals, and calculates, on a basis of the calculated frequency interval and a predetermined frequency interval between adjacent subcarriers, the carrier frequency interval.

5. A frequency control method in an optical communication system that comprises a first optical communication apparatus including a plurality of first transceivers capable of transmitting a frequency multiplexed signal in which a plurality of optical signals are frequency multiplexed and in which each of the optical signals includes a plurality of multiplexed subcarriers and a second optical communication apparatus including a plurality of second transceivers to receive the optical signals transmitted from the first transceivers, each of the second transceivers corresponding to a respective one of the optical signals, the method comprising:
   generating and transmitting the optical signals of different frequencies;
   performing a reception process on a band which is a processing target and in which a corresponding one of the transmitted optical signals is included;
   calculating a frequency offset amount between a frequency of local light and a carrier frequency of the corresponding one of the optical signals;
   calculating a carrier frequency interval that is a frequency interval between the frequency of the local light and a carrier frequency of an optical signal adjacent to the corresponding one of the optical signals;
   calculating, on a basis of the calculated frequency offset amount and the calculated carrier frequency interval, a frequency compensation amount for the optical signals transmitted by the first transceivers; and
   adjusting, on a basis of the calculated frequency compensation amount, frequencies of the optical signals transmitted by the first transceivers.

6. A control circuit of an optical communication apparatus that receives a frequency multiplexed signal in which a plurality of optical signals are frequency multiplexed and in which each of the optical signals includes a plurality of multiplexed subcarriers, wherein
   the optical communication apparatus comprises
      a plurality of transceivers, each of the transceivers corresponding to a respective one of the plurality of optical signals and configured to perform a reception process on a band which is a processing target and in which a corresponding one of the optical signals is included, and to calculate a frequency offset amount between a frequency of local light and a carrier frequency of the corresponding one of the optical signals and calculate a carrier frequency interval that is a frequency interval between the frequency of the local light and a carrier frequency of an optical signal adjacent to the corresponding one of the optical signals, and
   the control circuit is configured to calculate an adjustment amount on a basis of the calculated frequency offset amount and the calculated carrier frequency interval and to transmit the calculated adjustment amount to an optical communication apparatus that is a source of the optical signals, the transmitted adjustment amount being used by the source optical communication apparatus to adjust the carrier frequencies of the optical signals.

7. A non-transitory computer-readable recording medium of an optical communication apparatus that receives a frequency multiplexed signal in which a plurality of optical signals are frequency multiplexed and in which each of the optical signals includes a plurality of multiplexed subcarriers, the optical communication apparatus comprising a plurality of transceivers, each of the transceivers corresponding to a respective one of the plurality of optical signals and configured to perform a reception process on a band which is a processing target and in which a corresponding one of the optical signals is included, and to calculate a frequency offset amount between a frequency of local light and a carrier frequency of the corresponding one of the optical signals and calculate a carrier frequency interval that is a frequency interval between the frequency of the local light and a carrier frequency of an optical signal adjacent to the corresponding one of the optical signals, the recording medium storing therein a program for causing a processor to execute:
   a process of calculating an adjustment amount on a basis of the calculated frequency offset amount and the calculated carrier frequency interval and transmitting the calculated adjustment amount to an optical communication apparatus that is a source of the optical signals, the transmitted adjustment amount being used by the source optical communication apparatus to adjust the carrier frequencies of the optical signals.

* * * * *